April 20, 1965  G. C. LUEBKEMAN  3,179,101
TARGET TRAP
Filed Sept. 22, 1960  2 Sheets-Sheet 1

INVENTOR.
George C. Luebkeman
BY
Walter S. Murray
ATTY

April 20, 1965    G. C. LUEBKEMAN    3,179,101
TARGET TRAP

Filed Sept. 22, 1960    2 Sheets-Sheet 2

INVENTOR.
George C. Luebkeman
BY
ATTY.

United States Patent Office 3,179,101
Patented Apr. 20, 1965

3,179,101
TARGET TRAP
George C. Luebkeman, 214 Cherokee Ave.,
Cincinnati, Ohio
Filed Sept. 22, 1960, Ser. No. 57,671
6 Claims. (Cl. 124—8)

My invention relates generally to improvements in target traps and has for its principal object the provision of a novel trap capable of simultaneously throwing two targets into a similar and divergent flight trajectories which have the same speed and range components.

Another object of the invention is to provide in a target trap having the foregoing characteristics a simplified, rugged and readily adjustable means for varying the divergent angularity between the flight paths of two targets thrown by my trap.

A further object of the invention is to provide an adjustable mounting means for one of the two target throwing arms of my trap whereby upon setting of the trap to produce ideal flight characteristics for a target thrown by one arm the remaining arm can be adjusted to secure ideal flight characteristics for the target thrown by said arm.

Further objects of this invention will become apparent from the following description taken in conjunction with the accompanying drawings which illustrate preferred embodiments of my invention, and wherein.

Figure 1:
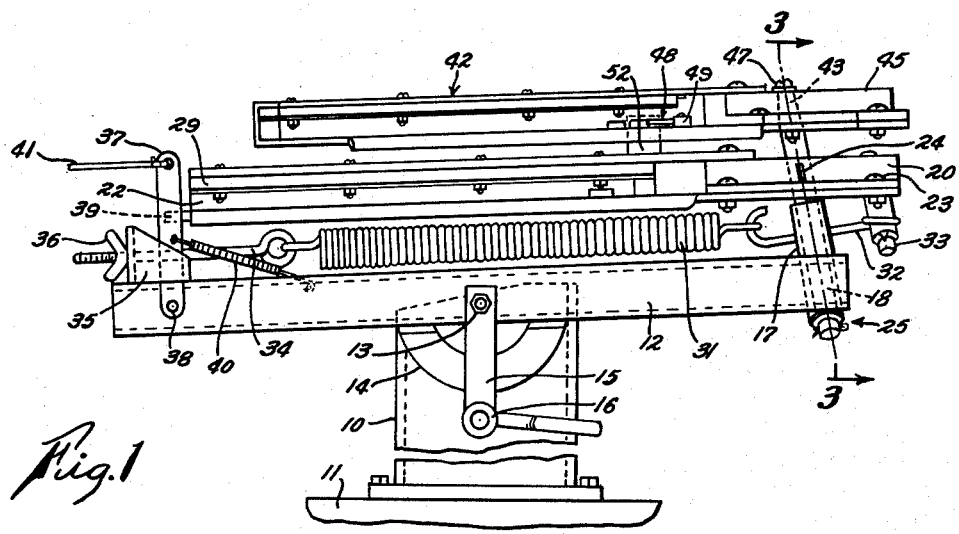
FIG. 1 is a fragmental side elevational view of one form of my target trap in cocked position in readiness to receive two targets.

Referring to FIGS. 1-4 of the drawings, one form of my target trap has a stand 10 bolted to a platform 11 and pivotally supporting a channel-shaped frame 12. The mounting for the frame comprises a pivot bolt 13 fixed to the stand and extending freely through the frame, said frame having an arcuate clamp plate 14 fixed thereto which is disposed between the front face of the stand and a clamp bar 15. The bar is secured at its upper end to the bolt 13 whilst the lower end engages a manually operated nut 16 threaded in a threaded tap in the stand, whereby the frame may be locked in adjusted, inclined positions on the stand.

Figure 3:
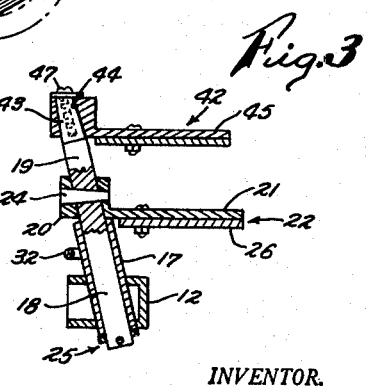
FIG. 3 is a section taken on line 3—3 of FIG. 1.

One end of the frame supports an upstanding sleeve 17 which in turn journals a shaft 18 projecting upwardly from the frame. An intermediate portion of the shaft projects through a bore formed through an integral shoulder portion 20 of a hub plate 21. The inner end of a first and lowermost throwing arm 22 is secured by bolts 23 to the hub plate. The shoulder portion 20 is fixed to the shaft by means of a tapered key 24 driven into aligned cooperating slots formed in both the shaft and the shoulder. As best shown in FIG. 3, the underside of the hub rests and is rotatable upon the upper end of the sleeve 17, the shaft being held against axial displacement in the sleeve by a washer and a cotter pin arrangement 25 on the depending end of the shaft 18. The throwing arm 22 is preferably formed from an aluminum stamping having a flat target supporting portion 26 terminating in a curved, downturned lip 27 extending along its leading edge and provided along its trailing edge with an integral channel shaped rail 28. The inner ends of the flat portion and of the rail lap and correspond to the configuration of the shoulder and plate portions of the hub, respectively, and are mounted thereon by the screws 23 which pass through aligned holes in the several parts. A rubber strip 29 is mounted in the rail by screws 30, the leading edge thereof projecting from the rail for engagement with a target T that is to be supported upon the portion 26. It will therefore be understood that the longitudinal axis of the arm 22 extends centrally along the rail 28 and that said axis projects laterally of the axis of the shaft 18.

A power means for actuating the target throwing arm 22 may comprise a heavy contractile spring 31 connected at one end to a link 32 and which in turn is connected to a stud 33 anchored in and depending from the outer end of the shoulder 20 on the hub plate 21. The other end of the spring is connected to an eye bolt 34 that extends through a hole in a bracket 35 fixed on an end of the frame 12, said bolt being adapted to put the spring under the required throwing tension by a wing nut 36 threaded to the bolt and bearing against the bracket. The arm is releasably held in spring loaded position by a lever 37 pivoted on the frame at 38 and biased for releasable engagement behind a catch 39 on the arm by means of a contractile spring 40 that engages the lever at one end and is hooked at its other end to the frame 12. Release of the spring loaded arm with a target thereon is accomplished by pulling a cord 41 connected to the upper end of the lever 37 whereupon the arm will swing around the shaft and launch the target T therefrom.

A second target throwing arm 42 is mounted on the shaft 18 above the throwing arm 22 with its longitudinal axis disposed laterally of the axis of the shaft 18 and, as the general features and construction of the two arms are substantially identical, arm 42 will not be described in detail. With reference to FIG. 3 of the drawing it will be seen that the shaft 18 has a tapered upper end 43 and that it extends through a cone bearing 44 formed in a hub plate 45 of the arm 42, a bolt and washer arrangement 47 being threaded in the top of the shaft to preclude axial displacement of the hub on the shaft.

The throwing arm 42 is drivingly connected to and positioned in divergent relationship with the throwing arm 22 about the shaft 18 by means of an adjustable connection or rod, generally indicated by the reference numeral 48. This connection may comprise an eye bolt 49 pivotally mounted to the arm 42 by a loose rivet 50 (FIG. 4) which projects through a slot 51 formed in the rail of the arm. The projecting end of the bolt passes loosely through a relatively large bore formed in a boss 52 which is in turn pivotally mounted upon the arm 22, set nuts 53 and 54 being threaded to the bolt on opposite sides of the boss, to adjust the angular divergent between the arm and hold the bolt in adjusted arm positions on the boss.

Figure 2:
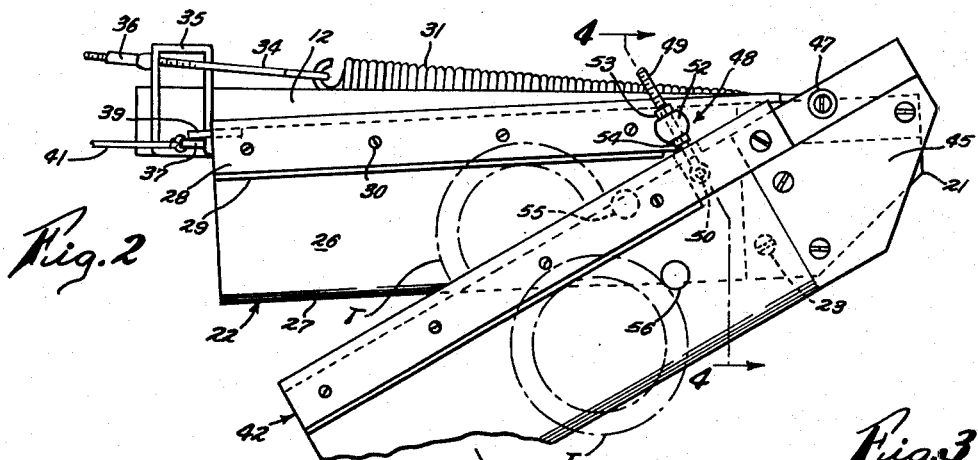
FIG. 2 is a fragmental, top plan view of the target trap shown in FIG. 1.
Figure 4:
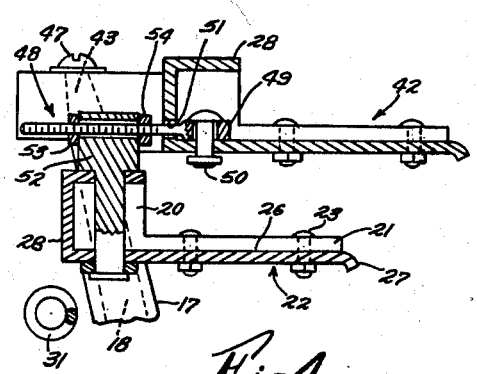
FIG. 4 is an enlarged section taken on line 4—4 of FIG. 2.

In the operation of the form of my device, shown in FIGS. 1-4 of the drawings, the trap stand 10 is first set in a position that will provide optimum flight characteristics for the clay target T thrown from the lower arm 22 which is directly actuated by the spring 31. The setting of the trap for this purpose involves the proper angularity of the platform 11, the inclination of the frame 12 with respect to the platform and the tension of the spring 31. Next the required angle of divergence between the trajectories of the two clay targets to be simultaneously thrown by the trap is made by manipulating the adjustable connection 48, it being common practice to use angles of target flight divergence that might vary between 20° up to perhaps 60°. The trap is then set by turning the arms to the positions shown in FIGS. 1 and 2 whereby the spring will be in loaded condition and the arm 26 held in set position behind the catch lever 37. Targets T are then placed upon the arms 26 and 42 as indicated in FIG. 2, their positions being predetermined by buttons 55 and 56, respectively, mounted on the arms. The lever is manually released to throw the two targets.

Simultaneous throwing of two targets through similar, divergent trajectories is attained in my trap by providing substantially identical arms that are actuated from a single spring and by a marker on each arm that is the same distance from the free ends of the arms. This is accomplished by mounting buttons 55 and 56 on the target supporting portions of the arms 22 and 42, respectively, whereby upon placement of targets on the arms against the buttons and centrifugal movements of the arms the targets will move equal distances upon the arms and leave the arms simultaneously into similar but divergent flights.

Figure 5:
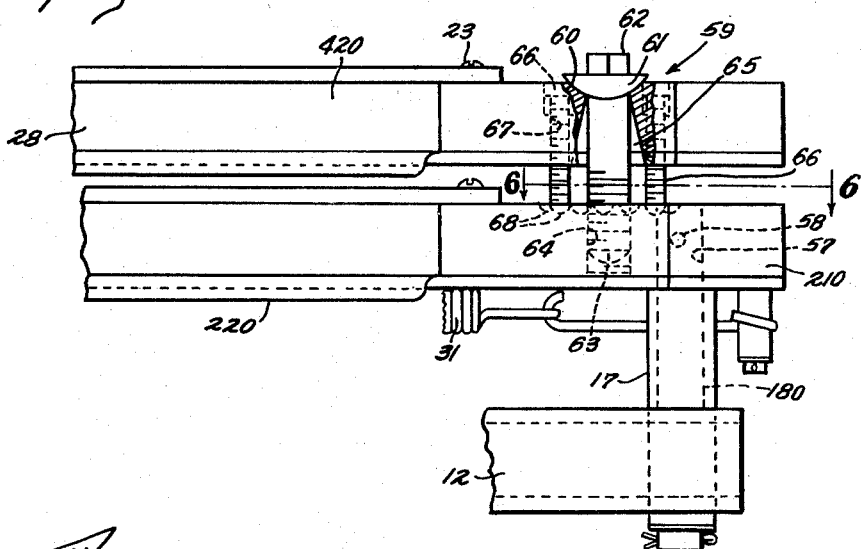
FIG. 5 is an enlarged, fragmental view in side elevation showing a modification of my target trap, parts thereof being broken away and shown in section.
Figure 6:
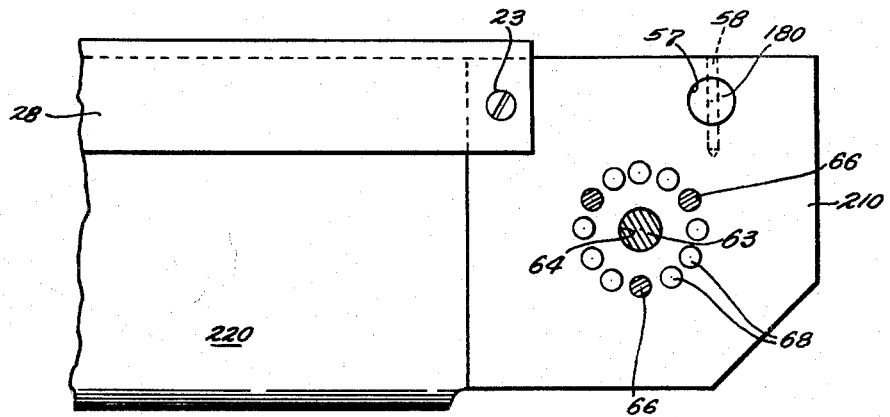
FIG. 6 is a section taken on line 6—6 of FIG. 5.

With reference to FIGS. 5 and 6 of the drawing which show a modification of my target trap and wherein like characters of reference indicate similar parts in the several views, the numeral 12 is the trap frame that supports a shaft 180 by means of the mounting sleeve 17 and in which the lower end of said shaft is journaled against axial movement. The upper end of the shaft 180 is received in a bore 57 in the hub 210 of a first target throwing arm 220, said arm being fixed to the shaft by a pin 58 that passes through aligned holes in the several parts. The spring loaded means 31 is adapted to provide power for the arm to launch a target therefrom in the same manner as is the arm 22 for the form of my trap shown in FIGS. 1–4. The longitudinal axis of the first arm 220 extends centrally through the rail 28 and this axis projects laterally of the axis of the shaft 180. A second target throwing arm 420 is mounted for swinging movement on the shaft 180 with its longitudinal axis projecting laterally of said shaft by the expedient of securing one end of said arm to an adjustable mounting means 59 positioned upon the hub 210 of the first arm 220. To this end the hub of the second arm 420 has a semicircular concave seat 60 formed therein for receiving the head 61 of a ball head set bolt 62, the opposed threaded end 63 of the bolt being threaded in a tapped bore 64 formed in the hub 210 of the first arm. As best shown in FIG. 5 the hub of arm 420 has an oversized, upwardly tapering bore 65 formed through the bottom thereof which communicates at its upper portion with the seat 60 to provide a clearance hole for limited universal adjustment of the arm 420 on the set bolt 62. Adjustment screws 66, preferably three in number are threaded in tapped bores 67 formed in the body of the hub of the arm 420, the bores being equal radial distances from the center of the set bolt 62 and 120° apart. The lower ends of the screws 66 are adapted to selectively cooperate with a circular row of angularly spaced apart, screw engaging seats 68 formed in the upper face of the hub 210 concentric with the center of the set bolt 62 to secure the desired divergence between the longitudinal axes of the arms 220 and 420 about the axis of the shaft 180.

In operation of the target trap illustrated in FIGS. 5 and 6 the trap frame is set in a position that will provide the best flight characteristics for a target thrown from the first arm 220. In some instances because of the divergence of flights of the two targets thrown simultaneously into a prevailing wind the target flights are not identical and it becomes necessary in order to secure identical flight characteristics to adjust the angular position of the arm 420 about its longitudinal axis. This angular adjustment of the arm 420 about its longitudinal axis is accomplished by loosening the set bolt 63 so that the arm 420 is free on the head 62 and then turning the adjustment screws until the required angularity is secured between the two arms whereupon the set bolt 63 is drawn up to hold the arms in fixed adjusted positions for throwing their respective targets.

What is claimed is:

1. A trap for throwing two targets comprising a frame, an upstanding shaft supported upon the frame, a first target throwing arm mounted at one end on the shaft, with its longitudinal axis projecting laterally of the shaft axis, power means on the frame and connected to the first arm to swing the arm and launch a target therefrom, a second target throwing arm mounted on the shaft with its longitudinal axis projecting laterally of the axis and having relative angular movement about the shaft axis with respect to the first arm, an extensible link connection between the arms, and means for locking the extensible connection in adjusted positions to hold the arms in divergent positions about the shaft.

2. A trap for throwing two targets as set forth in claim 1 characterized by the fact that the extensible link connection is an eye bolt pivoted to one arm and passed through a hole in a boss rotatably mounted on the other arm, and the locking means are nuts threaded to the bolt on opposite sides of the boss.

3. A trap for throwing two targets comprising a frame, an upstanding shaft supported on the frame, a first target throwing arm mounted at one end on the shaft, and having its longitudinal axis projecting laterally of the axis of the shaft, power means on the frame and connected to the first arm to swing the arm around the shaft as an axis to launch a target therefrom, a second target throwing arm movably mounted at one end on the shaft with its longitudinal axis laterally positioned with respect to the shaft, an adjustable connecting means between the arms to vary the angular divergence of the arms about the shaft, means for locking the adjustable means in selected positions, means on at least one of the arms for providing angular movement of said arm about its longitudinal axis, and means for locking said means in selected angular positions of the arm.

4. A trap for throwing two targets comprising a frame, an upstanding shaft supported on the frame, a first target throwing arm mounted at one end on the shaft and having its longitudinal axis projecting laterally of the axis of the shaft, power means on the frame and connected to the first arm to swing the arm around the shaft as an axis and launch a target therefrom, a second target throwing arm pivotally mounted at one end on the shaft above the first arm with its longitudinal axis laterally positioned with respect to the shaft, adjustable locking means for regulating the extent of divergence of the axes of the respective arms about the axis of the shaft to swing the second arm around the shaft and launch a target therefrom into a path horizontally divergent to the path of the target launched from the first arm, and an adjustable locking means between the shaft and the second arm for regulating the angular position of the arm about its longitudinal axis.

5. A trap for throwing two targets comprising a frame, an upstanding shaft supported upon the frame, a first target throwing arm mounted at one end on the shaft, with its longitudinal axis projecting laterally of the shaft axis, power means on the frame and connected to the first arm to swing the arm and launch a target therefrom, a second target throwing arm mounted on the shaft with its longitudinal axis projecting laterally of the axis and having relative angular movement with respect to the first arm, a set bolt threaded in the first arm and having a limited universal connection with the second arm, a circular row of angularly spaced apart seats formed in the first arm concentric with the set bolt, and a plurality of set screws threaded in the second arm and having their lower ends in engagement with selected seats in the first arm.

6. A target trap comprising a frame, an upstanding shaft supported on the frame, a pair of target throwing arms having their respective longitudinal axes projecting laterally from the shaft, means for fixedly mounting one of said arms on the shaft, the second said arm being spaced vertically from the one said arm and rotatably mounted on the shaft for relative angular adjustments about the axis of the shaft, power means carried by the frame and connected to the shaft for swinging the one said arm to launch a target therefrom, and an operable and adjustable connection between the arms for maintaining said arms in variable, angularly spaced apart positions about the shaft and adapted to swing the second said arm to launch a target therefrom.

References Cited by the Examiner

UNITED STATES PATENTS

| | | | |
|---|---|---|---|
| 822,741 | 6/06 | Ketcham | 124—8 |
| 963,347 | 7/10 | Winans | 124—8 |
| 1,445,371 | 2/23 | Vickery | 124—8 |
| 1,495,349 | 5/24 | Olin | 124—8 |
| 2,193,266 | 3/40 | Betts | 124—8 |

LOUIS R. PRINCE, *Primary Examiner.*

ELLIS E. FULLER, JAMES W. LOVE, *Examiners.*